US009230544B2

(12) United States Patent
Kwon et al.

(10) Patent No.: US 9,230,544 B2
(45) Date of Patent: Jan. 5, 2016

(54) SPOKEN DIALOG SYSTEM BASED ON DUAL DIALOG MANAGEMENT USING HIERARCHICAL DIALOG TASK LIBRARY

(71) Applicant: Electronics and Telecommunications Research Institute, Daejeon (KR)

(72) Inventors: Oh Woog Kwon, Daejeon (KR); Yoon Hyung Roh, Daejeon (KR); Seong Il Yang, Daejeon (KR); Ki Young Lee, Daejeon (KR); Sang Keun Jung, Daejeon (KR); Sung Kwon Choi, Daejeon (KR); Eun Jin Park, Daejeon (KR); Jinxia Huang, Daejeon (KR); Young Kil Kim, Daejeon (KR); Chang Hyun Kim, Daejeon (KR); Seung Hoon Na, Daejeon (KR); Young Ae Seo, Daejeon (KR); Yun Jin, Daejeon (KR); Jong Hun Shin, Daejeon (KR); Sang Kyu Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 259 days.

(21) Appl. No.: 13/849,853

(22) Filed: Mar. 25, 2013

(65) Prior Publication Data
US 2014/0136212 A1    May 15, 2014

(30) Foreign Application Priority Data

Nov. 14, 2012    (KR) .................. 10-2012-0128907

(51) Int. Cl.
G10L 15/00    (2013.01)
G10L 15/22    (2006.01)
H04M 3/493    (2006.01)
G06F 3/16    (2006.01)

(52) U.S. Cl.
CPC .............. *G10L 15/22* (2013.01); *G06F 3/167* (2013.01); *G10L 2015/225* (2013.01); *H04M 3/4938* (2013.01)

(58) Field of Classification Search
CPC ....... G10L 15/22; H04M 3/4938; G06F 3/167
See application file for complete search history.

(56) References Cited

U.S. PATENT DOCUMENTS

| 5,357,596 | A  | * | 10/1994 | Takebayashi et al. ........ 704/275 |
| 5,577,165 | A  | * | 11/1996 | Takebayashi et al. ........ 704/275 |
| 7,822,621 | B1 | * | 10/2010 | Chappel ........................... 705/2 |
| 7,953,219 | B2 | * | 5/2011  | Freedman et al. ....... 379/265.06 |
| 2006/0212296 | A1 | * | 9/2006 | Espy-Wilson et al. ........ 704/254 |
| 2011/0153322 | A1 |   | 6/2011 | Kwak et al. |

FOREIGN PATENT DOCUMENTS

KR    10-2007-0114530    12/2007

* cited by examiner

*Primary Examiner* — Daniel Abebe
(74) *Attorney, Agent, or Firm* — Nelson Mullins Riley & Scarborough LLP; Anthony A. Laurentano; Michael Malone

(57) ABSTRACT

The present invention relates to a spoken dialog system and method based on dual dialog management using a hierarchical dialog task library that may increase reutilization of dialog knowledge by constructing and packaging the dialog knowledge based on a task unit having a hierarchical structure, and may construct and process the dialog knowledge using a dialog plan scheme about relationship therebetween by classifying the dialog knowledge based on a task unit to make design of a dialog service convenient, which is different from an existing spoken dialog system in which it is difficult to reuse dialog knowledge since a large amount of construction costs and time is required.

11 Claims, 4 Drawing Sheets

SPOKEN DIALOG SYSTEM BASED ON DUAL DIALOG MANAGEMENT USING HIERARCHICAL DIALOG TASK LIBRARY

CROSS-REFERENCE TO RELATED APPLICATIONS

This application claims priority to and the benefit of Korean Patent Application No. 10-2012-0128907 filed in the Korean Intellectual Property Office on Nov. 14, 2012, the entire contents of which are incorporated herein by reference.

TECHNICAL FIELD

The present invention relates to a spoken dialog system and method based on a spoken dialog interface for an information service or foreign language education, and more particularly, to a spoken dialog system and method based on dual dialog management using a hierarchical dialog task library that may increase reutilization of dialog knowledge by constructing and packaging the dialog knowledge based on a task unit having a hierarchical structure, and may construct and process the dialog knowledge using a dialog plan scheme about a relationship therebetween by classifying the dialog knowledge based on a task unit to make design of a dialog service convenient, which is different from an existing spoken dialog system in which it is difficult to reuse dialog knowledge since a large amount of construction costs and time is required.

BACKGROUND ART

To apply a spoken dialog system to various domain tasks, it is effective to separate dialog knowledge about an applied domain task and a dialog processing engine for processing dialog using the dialog knowledge. A related art entitled "The rave claw dialog management framework: architecture and system (computer speech & language, 2009)" has proposed a dialog processing engine based on a task-independent and reusable dialog plan by proposing a dialog plan based task independent dialog management framework. In general, to provide a successful dialog service in a spoken dialog system, dialog knowledge (a domain meaning system, a task dialog flow, a dialog generation pattern, an application domain knowledge database (DB), and the like) suitable for a domain task and well defined is required. An operation of preparing dialog knowledge suitable for each domain task to be fitted for a given engine system requires a large amount of time and great effort. It is very difficult to construct a dialog managing engine without clearly knowing the contents of the dialog managing engine. The related art reuses an engine by simply separating the engine and knowledge and thus, may not reuse dialog knowledge of a domain task that increases efficiency of a dialog knowledge engine, which requires great effort.

The related art does not provide a scheme of packaging knowledge for each subtask of a domain task and does not provide a method capable of creating a new application domain by combining subtasks.

According to the related, spoken dialog systems use only a dialog management technology only for a response of a system to a user utterance and dialog progress and thus, do not have information about how a user induces or proceeds with a dialog after a system speech.

In a portion of spoken dialog systems, when a current system speech is a question, it is possible to know that a subsequent user utterance is an appropriate answer to the question. However, except for such fragmentary and partial dialog connection information, there is no information about how the user proceeds with a dialog throughout the entire domain task. That is, there is no information about what kind of question or content the user will request in a current situation. In the above unilateral system dialog management, leakage of dialog progress information on a user side about an application task causes unnecessary dialog between a system and a user to proceed, thereby decreasing availability of the spoken dialog system. When it is possible to provide information about how to proceed with a dialog, which may quickly and accurately complete the dialog in the given application on the user side, the spoken dialog system may be more conveniently used by providing a user dialog on the user side. Currently, the application range of the spoken dialog system has been expanded to a spoken dialog system for foreign language education as well as a spoken dialog interface in a mobile environment. When the spoken dialog system for foreign language education may propose various user dialogs and estimate a dialog length until a task is completed by each proposed user dialog, it is possible to variously teach foreign language by guiding a user to various dialog flows.

SUMMARY OF THE INVENTION

The present invention has been made in an effort to provide a spoken dialog system and method based on dual dialog management using a hierarchical dialog task library that may package and use dialog knowledge information of a domain task for each subtask.

The present invention also provides a spoken dialog system and method based on dual dialog management using a hierarchical dialog task library that enables a dialog service of a new application domain task by using as is existing subtask dialog knowledge required in a dialog knowledge library packaged for each task, which is already constructed by a dialog model designer designing a spoken dialog interface, or by changing the subtask dialog knowledge with dialog knowledge of a similar subtask.

The present invention also provides a spoken dialog system and method based on dual dialog management using a hierarchical dialog task library that enables dialog management of a user side, thereby enabling a more effective dialog flow by estimating a subsequent user dialog flow in the case of generating a system speech, and also proposes a user with a subsequent user dialog in a current situation in order to complete the dialog.

An exemplary embodiment of the present invention provides a spoken dialog system based on dual dialog management using a hierarchical dialog task library for a system response suitable for a user utterance input, the system including: a dialog knowledge database (DB) to store dialog knowledge required to achieve a dialog goal of a domain task; a hierarchical task based dialog knowledge managing unit to update the dialog knowledge DB with subtask dialog knowledge that is constructed or newly generated by a dialog service designer using subtask dialog knowledge; and a spoken dialog processing engine unit to perform a dialog with a user by repeatedly performing a process of recognizing a user utterance as a user utterance sentence, generating a system utterance text referring to the dialog knowledge DB in order to achieve the dialog goal of the domain task, and thereby outputting the generated system utterance text using voice.

The spoken dialog processing engine unit includes: a speech recognizing unit to generate the user utterance sentence by transcribing the user utterance; a language understanding unit to generate a several candidates for user utterance intention that the user desires to speak by analyzing the user utterance sentence as meaning representation; a system dialog managing unit to search for a system utterance intention and pattern by referring to the dialog knowledge DB with respect to meaning representation of several candidates for user utterance intention; a user dialog managing unit to search the dialog knowledge DB for the subsequent several candidates for user utterance intention after the system dialog managing unit generates the system utterance intention and pattern after a current user utterance; a dialog generating unit to search the dialog knowledge DB for the system utterance intention and pattern selected by the system dialog managing unit or the user dialog managing unit and a dialog pattern with respect to the several candidates for user utterance intention, and to generate a system utterance text using the found dialog pattern; and a speech synthesizing unit to output the generated dialog text using the voice.

The hierarchical task based dialog knowledge managing unit includes: a hierarchical task dialog knowledge library to hierarchically include the dialog knowledge stored in the dialog knowledge DB, dialog knowledge of a subtask of a domain task constructed by a designer, and dialog knowledge of an upper subtask; and a dialog knowledge constructing unit to update the dialog knowledge DB and the hierarchical task dialog knowledge library with dialog knowledge that is newly constructed or generated by the designer based on existing dialog knowledge of the hierarchical task dialog knowledge library.

The dialog knowledge DB includes: a hierarchical task flow graph DB to store a hierarchical task flow graph indicating a flow between subtasks for solving the domain task; a slot system DB to store a slot system in which meanings that need to be mutually known between a user and a system are classified in order to achieve a goal of the domain task; a dialog library DB to store a dialog library that is an aggregate of utterance patterns classified into an intention of the user and an intention of the system in order to generate a system speech in a predetermined situation in the domain task or to recommend the subsequent user utterances after the generated system utterance; and an application domain knowledge DB to store application domain knowledge in which knowledge that is to be known by the system in order to achieve a goal of an application domain task is databased.

The hierarchical task flow graph DB stores dialog flow graph knowledge expressing a time series context between subtasks for performing the domain task and flow information between subtasks according to a transition condition, and uses an integrated subtask as a task of an upper layer by integrating the subtasks.

In the slot system DB, each slot of the slot system includes a slot name and a type of a slot value that a slot may have, and the type of the slot value includes a number, a character string, a time, or a date.

The dialog library DB includes a response dialog library that is a utterance pattern associated with a response to a dialog of a responder and a corresponding utterance intention, a utterance pattern requesting a value for a predetermined slot to user or system, a progress dialog library consisted of the utterance pattern, and a subtask transition dialog library in which a utterance intention and a utterance pattern for each speaker in the case of start, end, or restart of a subtask are constructed.

Knowledge that a system needs to know in each subtask associated with the application domain task is databased and stored in the application domain DB.

The system dialog managing unit includes: a user intention selecting block to select the best user intention among the user intention candidates using dialog history; a user intention processing block to change the dialog history based on a dialog act type of the selected utterance intention of user; a system response utterance generating block to select a utterance pattern suitable for a dialog history using an example based scheme by searching a dialog library DB of the dialog knowledge DB for a response to the selected utterance intention of user or a corresponding system speech intention; a system progress utterance generating block to inquire the user about content in which a goal desired by the user is embodied, by inquiring the user about relevant slots required to embody a value of a target slot for completing a goal of a subtask currently in progress; and a system transition utterance generating block to find a system utterance pattern by searching the dialog library DB for a transition dialog with respect to a current subtask using a system speech intention informing the user about a progress state of the subtask at a point in time of start, end, or restart of the subtask.

The system dialog managing unit further includes: a dialog history including dialog section history that stores a speech intention between the user and the system in a dialog progress order using dialog flow information, subtask history that stores subtask progress history, and slot value history that describes a slot value of a slot that is transmitted and received between the user and the system and a state thereof, as data structure; and a dialog history management block to manage the history of the dialog history based on each user intention or system intention of the user intention processing block, the system response utterance generating block, the system progress utterance generating block, or the system transition utterance generating block.

The system progress utterance generating block generates system utterance inquiring slot value for achieving purpose of subtask based on the average dialog turn number required to complete the subtask by initially inquiring the user about relevant slots having a large ambiguous value by referring to the application domain knowledge DB of the dialog knowledge DB, or by transferring, to the user dialog managing unit, the system speech intention to inquire the user about, in order to embody the value of the target slot of the subtask.

The user dialog managing unit includes: a user response utterance generating block to generate a user utterance intention and pattern using an example based scheme by searching a response dialog of the dialog library DB of the dialog knowledge DB for a response to a system speech intention generated by the system dialog managing unit or a corresponding user intention; a user progress utterance generating block to inquire the user about content in which a goal is embodied in order to complete a goal of a current subtask; a user transition utterance generating block to generate a user utterance intention and pattern by searching a task transition dialog of the dialog library DB for a user utterance for verifying the content currently selected by the user or proceeding with a new subtask in the case of start or end of the subtask; and a subtask complete estimation block to verify how many dialog turns a currently generated user utterance intention further proceeds based on a response of a system until the goal of the subtask is completed, by repeatedly executing the system dialog managing unit and the user dialog managing unit.

The user dialog managing unit further includes: a temporary dialog history including dialog section history that stores a speech intention between the user and the system in a dialog progress order using dialog flow information, subtask history that stores subtask progress history, and slot value history that describes a slot value of a slot that is transmitted and received between the user and the system and a state thereof, as data structure; and a temporary dialog history management block to manage the history of the temporary dialog history based on a dialog context that is changed based on the user utterance intention through executing of the user response utterance generating block, the user progress utterance generating block, the user transition utterance generating block, or the subtask complete estimation block.

Another exemplary embodiment of the present invention provides a method for a spoken dialog between a system for performing a system response suitable for a user utterance input and a user in a spoken dialog system based on dual dialog management using a hierarchical dialog task library, the method including: storing, in a dialog knowledge DB, dialog knowledge required to achieve a dialog goal of a domain task; updating the dialog knowledge DB with subtask dialog knowledge that is constructed or is newly generated by a dialog service designer using subtask dialog knowledge; and performing a dialog with a user by repeatedly performing a process of recognizing a user utterance as a user utterance sentence, generating a system utterance text referring to the dialog knowledge DB in order to achieve the dialog goal of the domain task, and thereby outputting the generated system utterance text using voice.

The performing of the dialog with the user includes: generating the user utterance sentence by transcribing the user utterance; generating a several candidates for user utterance intention that the user desires to speak by analyzing the user utterance sentence as meaning representation; searching for a system utterance intention and pattern by referring to the dialog knowledge DB with respect to meaning representation of several candidates for user utterance intention; searching the dialog knowledge DB for the subsequent several candidates for user utterance intention after the system utterance intention and pattern are generated after a current user utterance; searching the dialog knowledge DB for the system utterance intention and pattern and a dialog pattern with respect to the several candidates for user utterance intention, and to generate a system utterance text using the found dialog pattern; and outputting the generated dialog text using the voice.

The updating of the dialog knowledge DB updates the dialog knowledge DB and the hierarchical task dialog knowledge library with dialog knowledge that is newly constructed or generated by the designer based on existing dialog knowledge of a hierarchical task dialog knowledge library to hierarchically include the dialog knowledge stored in the dialog knowledge DB, dialog knowledge of a subtask of a domain task constructed by a designer, and dialog knowledge of an upper subtask.

The dialog knowledge DB includes: a hierarchical task flow graph DB to store a hierarchical task flow graph indicating a flow between subtasks for solving the domain task; a slot system DB to store a slot system in which meanings that need to be mutually known between a user and a system are classified in order to achieve a goal of the domain task; a dialog library DB to store a dialog library that is an aggregate of utterance patterns classified into an intention of the user and an intention of the system in order to generate a system speech in a predetermined situation in the domain task or to recommend the subsequent user speech candidate; and an application domain knowledge DB to store application domain knowledge in which knowledge that is to be known by the system in order to achieve a goal of an application domain task is databased.

The hierarchical task flow graph DB stores dialog flow graph knowledge expressing a time series context between subtasks for performing the domain task and flow information between subtasks according to a transition condition, and uses an integrated subtask as a task of an upper layer by integrating the subtasks.

In the slot system DB, each slot of the slot system includes a slot name and a type of a slot value that a slot may have, and the type of the slot value includes a number, a character string, a time, a date, etc.

The dialog library DB includes a response dialog library that is a utterance pattern associated with a response to a dialog of a responder and a corresponding utterance intention, a utterance pattern requesting a predetermined slot value to user or system, a progress dialog library constructed the utterance pattern, and a subtask transition dialog library in which a utterance intention and a utterance pattern for each speaker in the case of start, end, or restart of a subtask are constructed.

Knowledge that a system needs to know in each subtask associated with the application domain task is databased and stored in the application domain DB.

The searching for the system utterance intention and pattern includes: selecting the best user intention among the user intention candidates using dialog history; changing the dialog history based on a dialog act type of the selected user utterance intention; selecting a utterance pattern suitable for a dialog history using an example based scheme by searching a dialog library DB of the dialog knowledge DB for a response to the selected user utterance intention or a corresponding system speech intention; embodying a value of a target slot for completing a goal of a subtask currently in progress based on a slot-filling scheme for embodying a goal desired by the user by inquiring the user about required relevant slots; and finding a system utterance pattern by searching the dialog library DB for a transition dialog with respect to a current subtask using a system speech intention informing the user about a progress state of the subtask at a point in time of start, end, or restart of the subtask.

The searching for the system utterance intention and pattern further includes: managing, in a dialog history, dialog section history that stores a speech intention between the user and the system in a dialog progress order using dialog flow information, subtask history that stores subtask progress history, and slot value history that describes a slot value of a slot that is transmitted and received between the user and the system and a state thereof; and changing the history of the dialog history based on each user intention or system intention in each process of the searching for the system utterance intention and pattern.

The embodying of the value of the target slot determines a value of a target slot of a subtask based on the average dialog turn number required to complete the subtask by initially inquiring the user about relevant slots having a large ambiguous value by referring to the application domain knowledge DB of the dialog knowledge DB, or by transferring, to the user dialog managing unit, the system speech intention to inquire the user about, in order to embody the value of the target slot of the subtask.

The searching the dialog knowledge DB for the subsequent several candidates for user utterance intention includes: generating a user utterance intention and pattern by searching a response dialog of the dialog library DB of the dialog knowledge DB for a response to a system speech intention generated in each operation of searching for the system speech intention or pattern or a corresponding user intention; calculating a value of a target slot for completing a goal of a current subtask based on a slot-filling scheme; generating a user utterance intention and pattern by searching a task transition dialog of the dialog library DB for a user utterance for verifying the content currently selected by the user or proceeding with a new subtask in the case of start or end of the subtask; and verifying how many dialog turns a currently generated user utterance intention further proceeds based on a response of a system until the goal of the subtask is completed, by repeatedly executing the system dialog managing unit and the user dialog managing unit.

The searching of the dialog knowledge DB for the subsequent several candidates for user utterance intention further includes: managing, in a temporary dialog history, dialog section history that stores a speech intention between the user and the system in a dialog progress order using dialog flow information, subtask history that stores subtask progress history, and slot value history that describes a slot value of a slot that is transmitted and received between the user and the system and a state thereof; and changing the history of the temporary dialog history based on a dialog context that is changed based on the user utterance intention through executing of each process of an operation of searching the dialog knowledge DB for the subsequent several candidates for user utterance intention.

According to exemplary embodiments of the present invention, a spoken dialog system and method based on dual dialog management using a hierarchical dialog task library may apply a spoken dialog system to a new domain task by reusing or referring to existing constructed dialog knowledge, thereby decreasing difficulty of a dialog service design and an amount of dialog knowledge construction costs and time, and making expansibility to a new domain easy.

According to exemplary embodiments of the present invention, dialog management on a user side is enabled, thereby enabling a more effective dialog flow by estimating a subsequent user dialog flow in the case of generating a current system speech. Therefore, a spoken dialog system for an information service may increase efficiency in achieving a goal of a user with minimum dialogs and may also propose the user with subsequent dialogs that the system may understand, so that the user may more friendly and conveniently use the spoken dialog system. A spoken dialog system for foreign language education may increase learning efficiency by proposing a learner with a subsequent probable foreign language speech in various forms.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
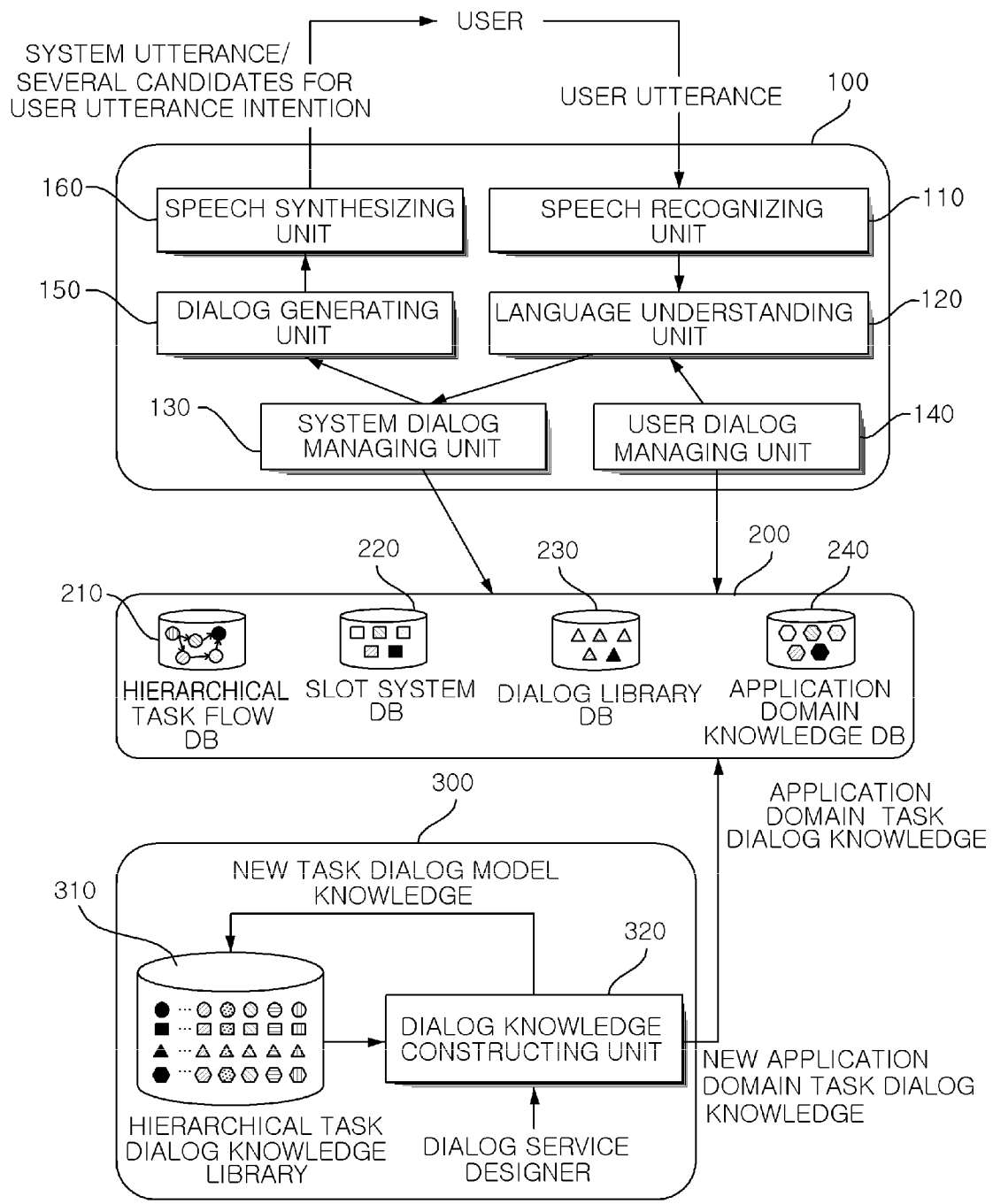
FIG. 1 is a block diagram of a spoken dialog system based on dual dialog management using a hierarchical dialog task library according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings, but the present invention is not limited thereto or restricted thereby.

FIG. 1 is a block diagram of a spoken dialog system based on dual dialog management using a hierarchical dialog task library according to an exemplary embodiment of the present invention.

Hereinafter, in description relating to an exemplary embodiment of the present invention, a user and a system language are in Korean and thus, an application domain task is set as a "purchase" task in a "tour product" domain" and "tour product purchase" is set as a domain task for easy understanding. In the case of a spoken dialog system for foreign language education, foreign languages such as English, Chinese, Japanese, and the like may be applied. An application domain may also be variously applied. For ease of description, an application domain task to be applied will be described in a very simplified task form compared to an actual task.

Referring to FIG. 1, a spoken dialog system based on dual dialog management using a hierarchical dialog task library according to an exemplary embodiment of the present invention includes a spoken dialog processing engine unit 100 to proceed with a dialog with a user in order to achieve a dialog goal of a domain task, a dialog knowledge database (DB) 200 to store dialog knowledge (information) of an application domain task required to achieve the dialog goal of the domain task, and a hierarchical task based dialog knowledge managing unit 300 to construct, in the dialog knowledge DB 200, the dialog knowledge of the application domain task by a dialog service designer using existing subtask dialog knowledge of a hierarchical task dialog knowledge library and to store and manage subtask dialog knowledge that is newly generated.

As illustrated in FIG. 1, the spoken dialog processing engine unit 100 includes a speech recognizing unit 110 to recognize and thereby transcribe a user utterance, a language understanding unit 120 to analyze the voice recognized user utterance sentence as meaning representation and thereby understand the voice recognized user utterance sentence, a system dialog managing unit 130 to search the dialog knowledge DB 200 for a system speech expression suitable for a current dialog context and achieving a goal of the application domain task with respect to a meaning representation of a user utterance, a user dialog managing unit 140 to search the dialog knowledge DB 200 for a suitable several candidates for user utterance intention after the system dialog managing unit 130 searches for the suitable system dialog expression after a current user utterance, a dialog generating unit 150 to search the dialog knowledge DB 200 for a dialog pattern meaningfully suitable for the system speech expression and the several candidates for user utterance intention selected by the system dialog managing unit 130 or the user dialog managing unit 140, and to generate a system utterance text using the found dialog pattern, and a speech synthesizing unit 160 to output the generated dialog text using voice.

As illustrated in FIG. 1, the dialog knowledge DB 200 for the application domain task includes a hierarchical task flow graph DB 210 to store a hierarchical task flow graph indicating a flow between subtasks for solving the domain task, a slot system DB 220 to store a slot system in which meanings that need to be mutually known between a user and a system are classified in order to achieve a goal of the domain task, a dialog library DB 230 to store a dialog library that is an aggregate of utterance patterns classified into an intention of the user and an intention of the system in order to generate a system speech in a predetermined situation in the domain task or to recommend the subsequent user speech candidate, and an application domain knowledge DB 240 to store application domain knowledge in which knowledge that is to be known by the system in order to achieve a goal of an application domain task is databased.

Referring to FIG. 1, the hierarchical task based dialog knowledge managing unit 300 includes a hierarchical task dialog knowledge library 310 to package and thereby include, as dialog knowledge for each task, the hierarchical task flow graph DB 210, the slot system DB 220, the dialog library DB 230, the application domain knowledge DB 240, and the like that are required for processing a dialog for each task, and a dialog knowledge constructing unit 320 to search and manage (store, delete, change, or edit) the hierarchical task dialog knowledge library 310 so that the dialog service designer may reuse the pre-constructed dialog knowledge for each task of the hierarchical task dialog knowledge library 310, may newly construct a knowledge task by referring to a task similar to a required usage, or may design a larger task using a combination thereof, in order to construct dialog knowledge for a new application domain task in the application domain knowledge DB 240.

More specifically describing, the speech recognizing unit 110 converts the user utterance to a transcribed text. The speech recognizing unit 110 specializes a language model in an application domain that is currently desired to be applied using a user utterance pattern and sentence that may appear in the application domain task constructed in the dialog knowledge library 310, and thereby converts the language model to a user utterance text for enhancing the performance thereof.

The language understanding unit 120 analyzes a language to be suitable for a user language by using the voice recognized user utterance text as an input, and recognizes a user utterance intention that the user desires to speak by performing slot recognition and dialog act type recognition based on the analyzed result. For example, with respect to a user utterance "what kind of tour products do you have to go to Jeju-do?", a current sentence is recognized as request that is an already defined dialog act type. In the above example question, a meaning (slot) of the question that the user gave is a predefined slot called "tour_name" and user utterance intention dialog act including that a slot "tour_place" corresponding to a place of tour has a value "Jeju-do" may be expressed as request (tour_name, tour_place="Jeju-do"). The language understanding unit 120 generally uses even morpheme analysis and part-of-speech tagging operation as a language analysis operation, and generally uses a statistical classification method in order to perform slot recognition and dialog act type recognition and to recognize a dialog act through a combination thereof. For the statistical classification method, a user intention tagged learning corpus that is a set of user intention tagged user utterance sentences is required. The user intention tagged learning corpus for each application domain may be extracted from the dialog library DB 230 and the application domain knowledge DB 240 of the application domain task dialog knowledge DB 200. The dialog library DB 230 includes a dialog act and a utterance pattern with respect to all of the speeches of the user for the application domain. For example, a utterance pattern with respect to a dialog act "request (tour_name, tour_place=value)" includes "what kind of tour products do you have to go to <tour_place>?", "which product is to go to <tour_place>?", "which tour product is to go to <tour_place>?", and the like. A value about an empty slot variable portion in the utterance pattern may be found by searching a domain knowledge DB included in the application domain knowledge DB 240. That is, the language understanding unit 120 may generate a user intention tagged learning corpus suitable for a given domain by finding a DB value about "tour_place" that is place information about each tour product, and by inputting, into the utterance pattern, a tour_place value such as "Jeju-do", "Seoraksan", "Busan", and the like appearing in the DB, may generate a classification learning corpus for slot recognition and dialog act type recognition to be suitable for the application domain, and may perform slot recognition and dialog act type recognition.

Figure 2:
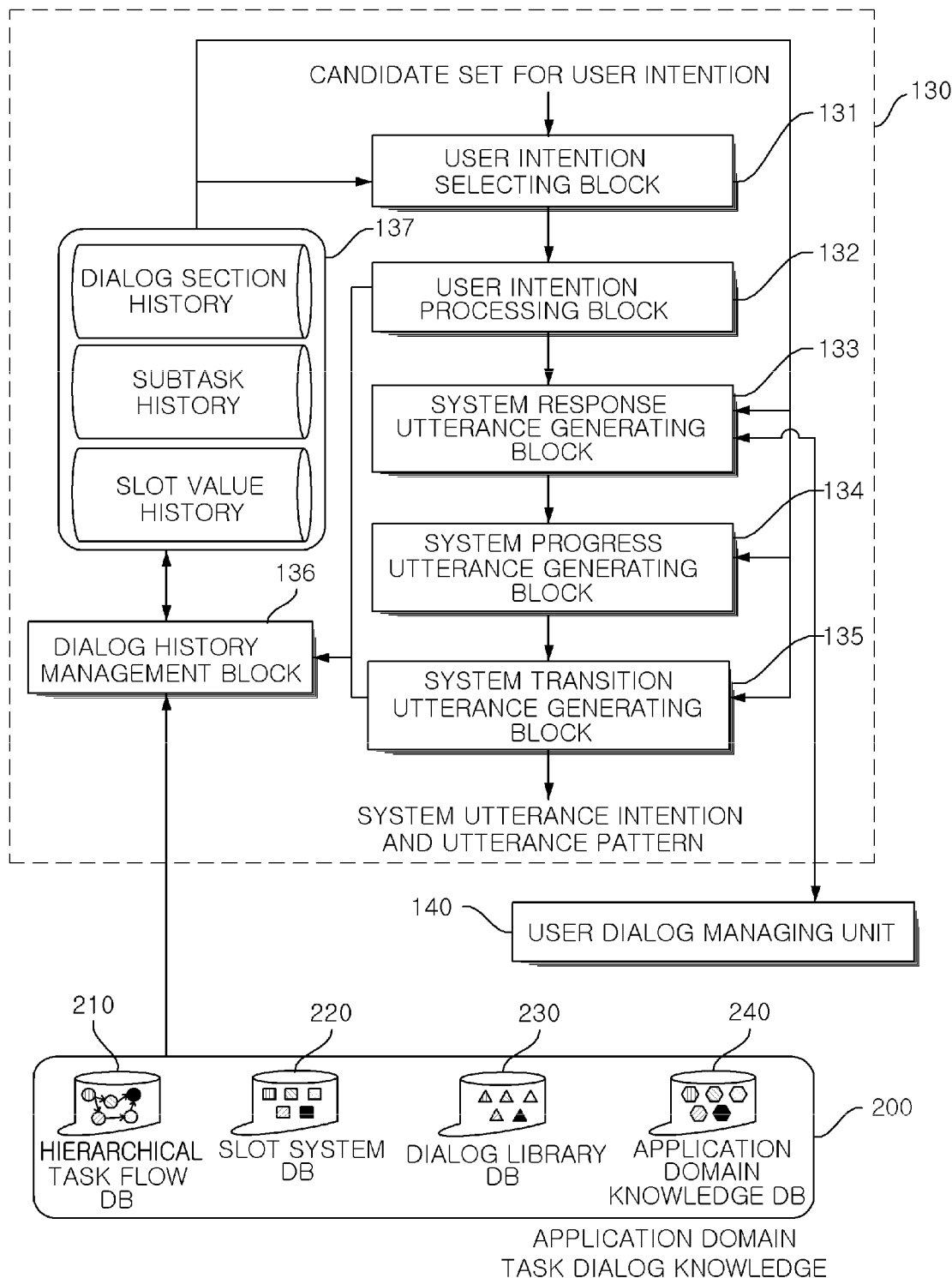
FIG. 2 is a diagram to describe an operation associated with a system dialog managing unit of FIG. 1 in more detail.

FIG. 2 is a diagram to describe an operation associated with the system dialog managing unit 130 of FIG. 1 in more detail.

As described above, when several candidates for user utterance intentions (candidate sentences about the request (tour_name, tour_place="Jeju-do") according to the user utterance intention recognized by the language understanding unit 120 are generated, the system dialog managing unit 130, as illustrated in FIG. 2, includes a user intention selecting block 131 to select a most suitable user utterance intention (dialog act type, a slot, a slot value, and the like) by using, as an input, a plurality of candidates corresponding to the user utterance intention analyzed by the language understanding unit 120, and using current dialog history of a dialog history 137 and subsequent probable several candidates for user utterance intentions after a previous system speech among the plurality of candidates, a user intention processing block 132 to change the dialog history 137 through a dialog history management block 136 based on the dialog act type, the slot, and the slot value appearing in the selected user utterance intention, a system response utterance generating block 133 to select a utterance pattern suitable for a dialog history by searching the dialog library DB 230 for a response to the selected user utterance intention or a corresponding system speech intention, a system progress utterance generating block 134 based on a slot-filling scheme to embody a goal desired by the user by inquiring the user about relevant slots required to embody a value of a target slot for completing a goal of a subtask currently in progress, and a system transition utterance generating block 135 to find a system utterance pattern by searching the dialog library DB 230 for a transition dialog with respect to a current subtask using a system speech intention informing the user about a progress state of the subtask at a point in time of start, end, or restart of the subtask. The dialog history 137 includes dialog section history that stores a speech intention between the user and the system in a dialog progress order using dialog flow information, subtask history that stores subtask progress history, and slot value history that describes a slot value of a slot that is transmitted and received between the user and the system and a state thereof, as data structure. The dialog history management block 136 manages the history of the dialog history 137 based on the user intention and the system intention.

Referring to FIG. 2, the system progress utterance generating block 134 may use one of the following two methods as a priority of relevant slots to inquire the user with in order to embody the value of the target slot of the subtask.

The system progress utterance generating block 134 generates system utterance inquiring slot value for achieving purpose of subtask based on the average dialog turn number required to complete the subtask:

(1) by initially inquiring the user about relevant slots having a large ambiguous value by referring to the application domain knowledge DB 240 in order to determine the value of the target slot as one, or (2) by transferring (outputting), to the user dialog managing unit 140, the system speech intention to inquire the user about.

When the spoken dialog system is for an information service, the system speech intention requesting a question about a relevant slot using the smallest average dialog turn number for completing the subtask may be selected to inform the user about accurate information as soon as possible. When the spoken dialog system is for foreign language education, a dialog turn that is long or short may be selected based on a level of a learner. For example, when the user inquires about a tour product about going to Jeju-do at a tour product purchase desk, the system may inquire the user about a date (or duration), a price, and other items in order to select only one product desired by the user from among tour products associated with Jeju-do. According to the method (1), the system may initially inquire the user about a slot in which each product has a different characteristic among characteristics of Jeju-do tour products in the application domain knowledge DB 240 and thereby proceed with a dialog to determine a Jeju-do tour product desired by the user. For example, when products are easily classified based on tour duration, the system may initially inquire the user about most desired tour duration and thereby make a decision. According to the method (2), to complete a tour product selection subtask, the system may proceed by selecting a currently available progress dialog and virtually diversifying an answer of the selected progress dialog in the user dialog managing unit 140. The system may set a weight of a current progress dialog by determining, as a weight, the averaged dialog turn number used until the subtask goal is achieved.

As a question utterance pattern about a progress slot selected by the system progress utterance generating block 134, a utterance pattern most suitable for a current context may be selected by searching for progress dialogs of the dialog library DB 230 of the application domain task dialog knowledge 200.

The dialog history management block 136 stores, in the dialog history 137, or changes each user intention and system intention of the user intention processing block 132, the system response utterance generating block 133, the system progress utterance generating block 134, and the system transition utterance generating block 135. In the case of storing the dialog section history of the dialog history 137, the dialog history management block 136 stores intention information about the dialog between the system and the user in a dialog order. In the case of storing the subtask history, the dialog history management block 136 verifies whether the subtask is completed since the goal of the subtask currently in progress is satisfied after each user intention and system intention and whether a new subtask is started, and stores changed items relating thereto. In the case of storing slot value history, the dialog history management block 136 stores a circumstance where a value of each slot is changed after each speech intention and determines whether the value thereof and a previous speech state are changed and whether the value is reliable, thereby indicating and storing a state of the slot value.

The dialog history 137 managed by the dialog history management block 136 is used when verifying a dialog flow in the user intention selecting block 131, the system response utterance generating block 133, and the like, or is used when verifying whether each subtask has achieved a goal and whether a utterance pattern selection condition satisfies the current dialog context.

Figure 3:
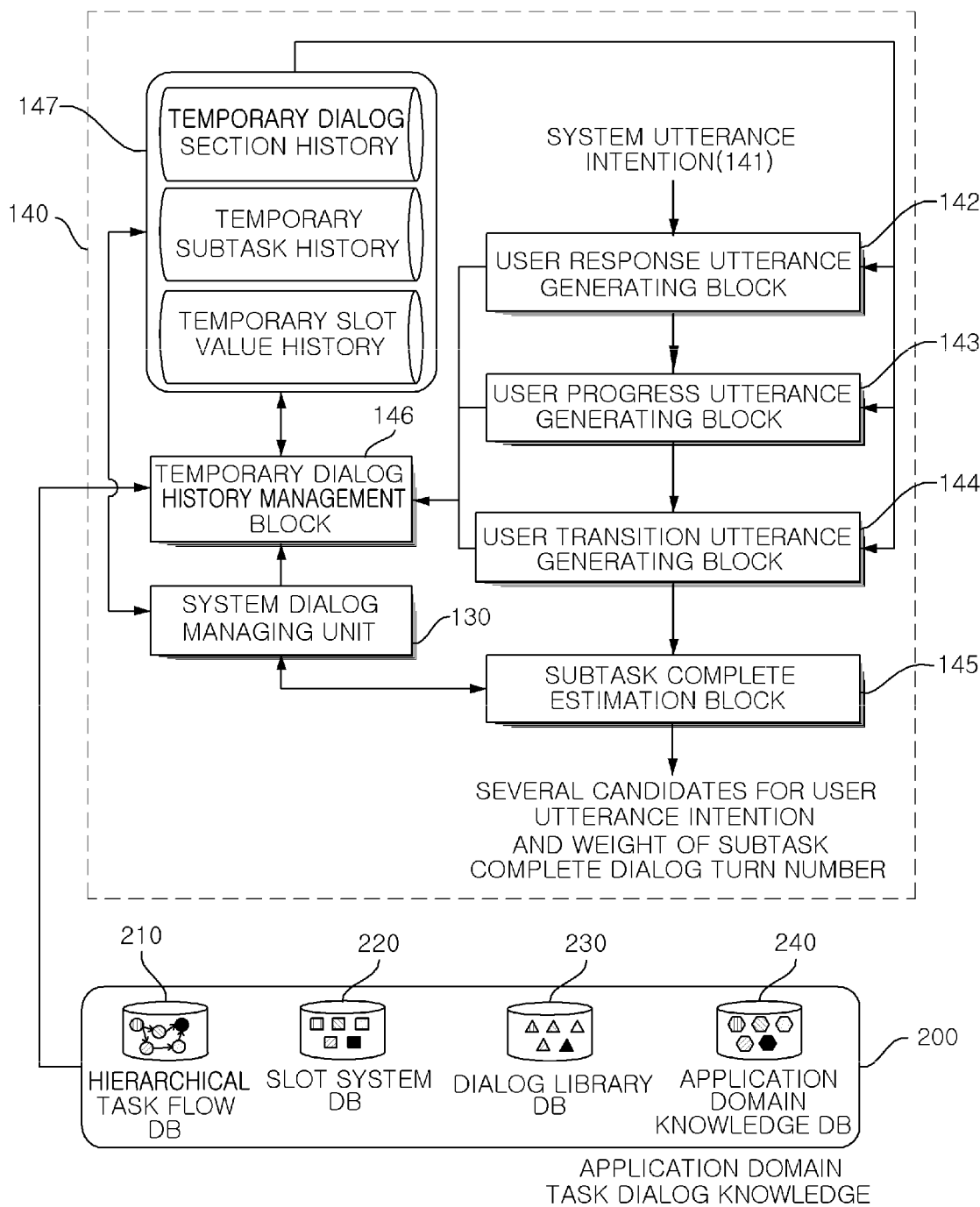
FIG. 3 is a diagram to describe an operation associated with a user dialog managing unit of FIG. 1 in more detail.

FIG. 3 is a diagram to describe an operation associated with the user dialog managing unit 140 of FIG. 1 in more detail.

As illustrated in FIG. 3, using blocks of the system dialog managing unit 130 that are configured to perform processing based on a system side and a temporary dialog content history block 147 that duplicates a current value of the dialog history 137, the user dialog managing unit 140 generates subsequent dialog candidates of the user that the user may speak in order to achieve a goal of a subtask after a current system speech on a user side. The user dialog managing unit 140 includes a user response utterance generating block 142 to generate a user utterance intention and pattern by searching a response dialog of the dialog library DB 230 of the application domain task dialog knowledge DB 200 for a response to a system speech intention 141 generated by the system dialog managing unit 130, using the system speech intention 141 as an input, or a corresponding user intention, a user progress utterance generating block 143 based on a slot-filling scheme to solve a value of a target slot for completing a goal of a current subtask, a user transition utterance generating block 144 to generate a user utterance intention and pattern by searching a task transition dialog of the dialog library DB 230 of the application domain task dialog knowledge DB 200 for a user utterance that enables the user to appropriately verify the content currently selected by the user or to proceed with a new subtask in the case of start or end of the subtask, a subtask complete estimation block 145 to verify how many dialog turns a currently generated user utterance intention further proceeds based on a response of a system until the goal of the subtask is completed, by repeatedly executing the system dialog managing unit 130 and the user dialog managing unit 140, a temporary dialog history 147 to store a dialog context changed based on a corresponding intention after a user utterance intention is generated by the blocks 142 through 144, and a temporary dialog history management block 146 to manage the history of the temporary dialog history 147 based on the user utterance intention.

The user progress utterance generating block 143 generates the user utterance intention by selecting a progress slot according to the above method (1) of the system progress utterance generating block 134 and thereby searches a progress dialog of the dialog library DB 230 of the application domain task dialog knowledge DB 200 for a slot progress utterance pattern in which a speaker is a user. When the present spoken dialog system is used for foreign language education, a predetermined subject or mission is assigned to a learner, and which slot should have which value is known, it is possible to select a progress slot that enables such user subject and mission to well proceed. Accordingly, it is possible to enable the learner to learn a foreign language dialog that may be helpful to perform the subject and the mission.

Meanwhile, the dialog generating unit 150 of FIG. 1 fills an accurate slot value in a portion in which a slot value present in a utterance pattern needs to be input using a system utterance pattern that is a result of the system dialog managing unit 130, using information stored in the current dialog history 137 and the application domain knowledge DB 240 of the application domain task dialog knowledge DB 200. Accordingly, the dialog generating unit 150 generates a system utterance text by performing linguistic deformation processing. The dialog generating unit 150 generates a speech for recommending a user utterance after the current system speech proposed by the user dialog managing unit 140. Here, with respect to various user utterance patterns, a slot value currently known to the system is filled in a portion where a slot value of a utterance pattern needs to be input, and a portion where the user needs to select is substituted with a description about the slot. For example, in the case where a subsequent user utterance pattern is "I want to travel to <tour_place> for <tour_duration>", when the user has already spoken "Jeju-do" as "<tour_place>" that the user desires to go to and <tour_duration> is unknown", "I want to travel to Jeju-do for <tour_duration, ex) one night two days>" is generated. In the case of the spoken dialog system for the information service, the following subsequent user utterance pattern generation functions to guide the user about which speech enables the system to understand better and how to use the system. In the case of the spoken dialog system for foreign language education, a learner is enabled to learn a subsequent utterance pattern and learning effect may be increased by removing or filling a portion where a slot value needs to be filled.

The speech synthesizing unit 160 converts, to a voice signal, a text about the system speech generated by the dialog generating unit 150.

The hierarchical task flow graph DB 210 stores dialog flow graph knowledge (information) expressing a time series context between subtasks for performing the domain task. Each subtask includes a subtask name, a goal of a subtask, a target slot name, a relevant slot name, and the like. The hierarchical task flow graph DB 210 has flow information about to which subtask to finally transit in which condition. For example, the tour product purchase domain task may be classified into subtasks such as "greeting", "tour product selection", "product purchase", "payment", "closing", and the like. A goal of the greeting subtask is configured for the first greeting of the system, a goal of the tour product selection subtask is configured to find a tour product desired by the user, a goal of the product purchase subtask is configured to determine how many items of tour products the user will purchase, a goal of the payment subtask is configured so that the user may make a payment about a product to be purchased and thereby purchase the product, and a goal of the closing subtask is configured for the final closing of the system.

Figure 4:
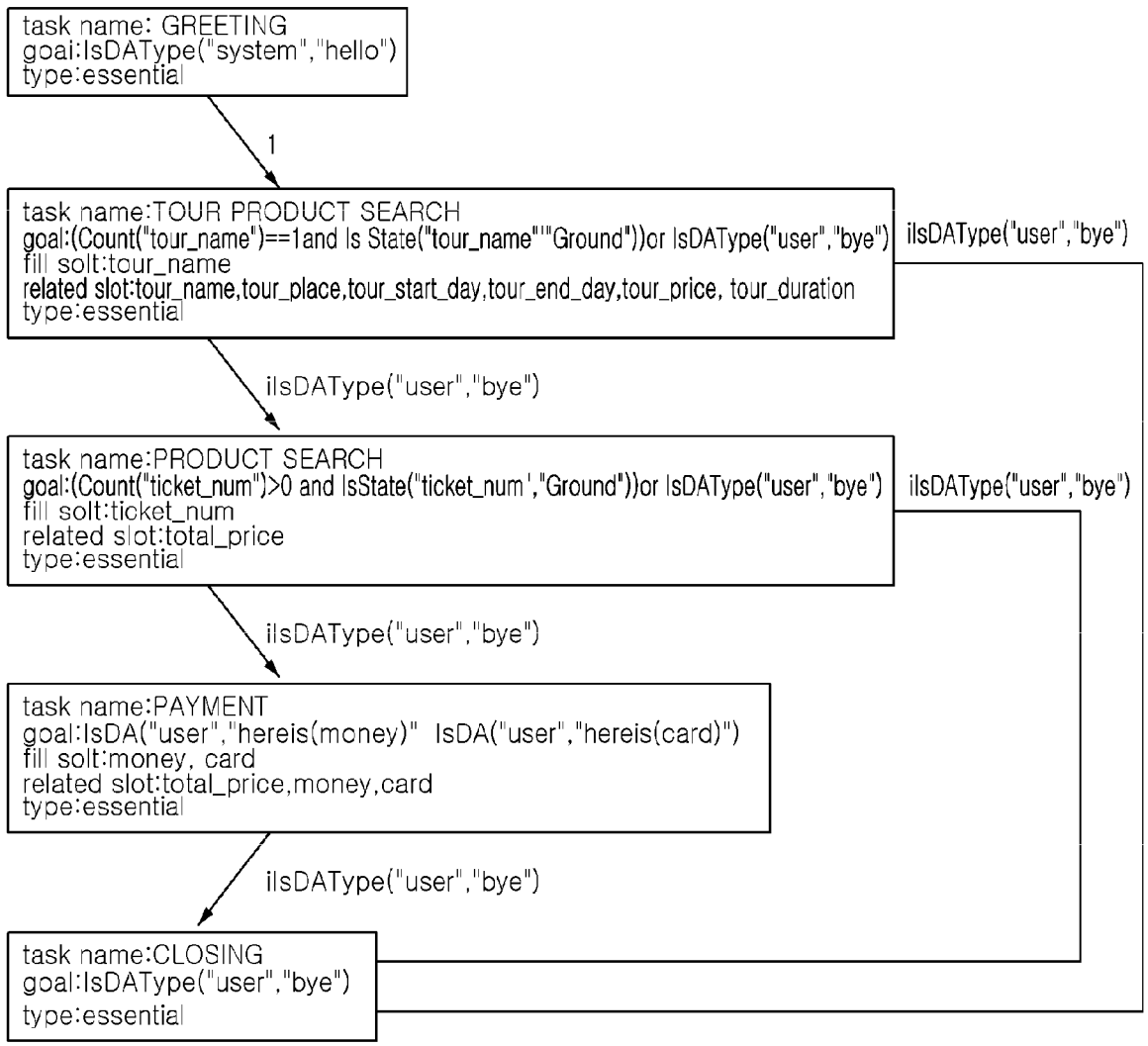
FIG. 4 is a diagram to describe an example of subtask flow information stored in a hierarchical task flow graph database (DB) of FIG. 1.

FIG. 4 briefly illustrates an example of a subtask flow. In FIG. 4, IsDAType ("system", "hello") is a function indicating whether the system has spoken dialog act type "hello" and. IsDA ("user", "hereis(money)") is a function verifying whether the user has spoken with an intention to pay money. Count ("tour_name") is a function proposing how many current tour_name values are, and IsState ("tour_name", "Ground") is a function verifying whether a value of a tour_name slot is verified by all of the system and the user.

For reutilization of a task and convenience of a design as above, the hierarchical task flow graph DB 210 has a hierarchical task structure in which a plurality of subtasks may be grouped into a single upper subtask. In the hierarchical task flow graph DB 210, the entire domain task graph proposes a dialog plan for performing the entire domain task. Each subtask has a goal for finding a predetermined speech or a predetermined slot value and thus, is configured to be performed using a slot-filling scheme or an example scheme. Accordingly, the proposed spoken dialog system based on dual dialog management using the hierarchical dialog task library is a new hybrid dialog processing method of employing all of the slot-filling scheme that is advantageous in a domain having a relatively small task and thus, is widely adopted by a general commercialized spoken dialog system, an example based scheme that is advantageous for a response to a general dialog such as English education or a chatting robot, and a dialog plan scheme that is advantageous in processing a complex task, but has disadvantages such as difficulty in expandability and complexity of plan design, thereby easily expanding a small subtask to a large task and overcoming the problems, such as constraints on the task range of the existing slot filling scheme and example based scheme, and the design complexity and difficulty in expandability of the dialog plan scheme.

The slot system DB 220 describes and stores meaning categories for transferring an intention between the user and the system in order to achieve a goal of each subtask. Each slot has a slot name and a type of a value that a slot may have. The type of the slot value may include a number, a character string, a time, a date, and the like. The slot system defines a relationship between the respective slots. The slot system expresses which slot has a subordinate relationship with which slot. For example, there is a relationship in which when a tour_name (tour_name) is unknown, a tour price (tour_price) slot is also unknown. Accordingly, a value of "tour_name" needs to be known before the "tour_price" slot at all times. There is a need to define a relationship between slot values regarding that each slot value affects another slot value. For example, when purchasing three predetermined tour products, "total_price" that is a total price needs to be expressed as a multiplication of "tour_price" of "tour_name" and "ticket_num".

The dialog library DB 230 is a DB in which user and system speech intentions that may appear in a relative subtask and utterance patterns according thereto are already constructed. The dialog library DB 230 includes three types of dialog type libraries, a response dialog library that is a utterance pattern associated with a response to a dialog of a responder and a corresponding utterance intention, a utterance pattern requesting a predetermined slot value to user or system, a progress dialog library constructed the utterance pattern, and a subtask transition dialog library in which a utterance intention and a utterance pattern for each speaker in the case of start, end, or restart of the subtask are constructed. Each dialog is configured to describe a usage condition so that a current dialog context may use a utterance intention and a dialog pattern satisfying the usage condition.

The application domain knowledge DB 240 stores knowledge information in which knowledge that the system needs to know in a subtask associated with an application domain task is expressed in a DB form. For example, the "tour product selection" subtask databases and thereby stores information about a tour product that may be provided by the system.

The hierarchical task dialog knowledge library 310 is a dialog knowledge library in which existing dialog knowledge of subtasks of the domain task constructed by dialog service designers, existing dialog knowledge of an upper subtask, and the like are stored. By briefly describing a domain, a task, a usage area with respect to each subtask, a subsequent search may be easily performed.

The dialog knowledge constructing unit 320 supports required dialog knowledge to be designed and constructed when the dialog service designer desires to apply the spoken dialog system to a new domain task. The dialog knowledge constructing unit 320 searches the hierarchical task dialog knowledge library 310 for subtasks available for the new domain task desired to be developed. When the subtasks are present, the dialog knowledge constructing unit 320 may immediately use the subtasks. For example, the payment subtask of the tour product purchase domain task may be used for all types of purchase tasks. When a subtask to be immediately used is absent, the dialog knowledge constructing unit 320 may find the most similar subtask and thereby conveniently construct dialog knowledge by referring to dialog knowledge in which the similar subtask is constructed. For example, the tour product selection subtask of the tour product purchase domain task may be a model of various product selection subtasks, and each slot system and required dialogs may be easily obtained. The dialog knowledge constructing unit 320 provides an edition and tool supporting function capable of directly constructing dialog knowledge of a new subtask, and also provides a function of embodying a flow of the entire domain task that is configured through combination and connection between subtasks.

In the new domain task generated through the dialog knowledge constructing unit 320, dialog knowledge is stored in the hierarchical task dialog knowledge library 310 based on a task unit for each hierarchy. Therefore, it is possible to easily perform domain expansion by reusing the dialog knowledge.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A spoken dialog system based on dual dialog management using a hierarchical dialog task library for a system response suitable for a user utterance input, the system comprising:
    a dialog knowledge database (DB) to store dialog knowledge required to achieve a dialog goal of a domain task;
    a hierarchical task based dialog knowledge managing unit to update the dialog knowledge DB with subtask dialog knowledge that is constructed or newly generated by a dialog service designer using subtask dialog knowledge; and
    a spoken dialog processing engine unit to perform a dialog with a user by repeatedly performing a process of recognizing a user utterance as a user utterance sentence, generating a system utterance text referring to the dialog knowledge DB in order to achieve the dialog goal of the domain task, and thereby outputting the generated system utterance text using voice.

2. The system of claim 1, wherein the spoken dialog processing engine unit comprises:
    a speech recognizing unit to generate the user utterance sentence by transcribing the user utterance;
    a language understanding unit to generate a several candidates for user utterance intention that the user desires to speak by analyzing the user utterance sentence as meaning representation;
    a system dialog managing unit to search for a system utterance intention and pattern by referring to the dialog knowledge DB with respect to meaning representation of several candidates for user utterance intention;
    a user dialog managing unit to search the dialog knowledge DB for the subsequent several candidates for user utterance intention after the system dialog managing unit generates the system utterance intention and pattern after a current user utterance;
    a dialog generating unit to search the dialog knowledge DB for the system utterance intention and pattern selected by the system dialog managing unit or the user dialog managing unit and a dialog pattern with respect to the several candidates for user utterance intention, and to generate a system utterance text using the found dialog pattern; and
    a speech synthesizing unit to output the generated dialog text using the voice.

3. The system of claim 1, wherein the hierarchical task based dialog knowledge managing unit comprises:
    a hierarchical task dialog knowledge library to hierarchically include the dialog knowledge stored in the dialog knowledge DB, dialog knowledge of a subtask of a domain task constructed by a designer, and dialog knowledge of an upper subtask; and
    a dialog knowledge constructing unit to update the dialog knowledge DB and the hierarchical task dialog knowledge library with dialog knowledge that is newly constructed or generated by the designer based on existing dialog knowledge of the hierarchical task dialog knowledge library.

4. The system of claim 1, wherein the dialog knowledge DB comprises:
    a hierarchical task flow graph DB to store a hierarchical task flow graph indicating a flow between subtasks for solving the domain task;
    a slot system DB to store a slot system in which meanings that need to be mutually known between a user and a system are classified in order to achieve a goal of the domain task;
    a dialog library DB to store a dialog library that is an aggregate of utterance patterns classified into an intention of the user and an intention of the system in order to generate a system speech in a predetermined situation in the domain task or to recommend the subsequent user speech candidate; and
    an application domain knowledge DB to store application domain knowledge in which knowledge that is to be known by the system in order to achieve a goal of an application domain task is databased.

5. The system of claim 4, wherein the hierarchical task flow graph DB stores dialog flow graph knowledge expressing a time series context between subtasks for performing the domain task and flow information between subtasks according to a transition condition, and uses an integrated subtask as a task of an upper layer by integrating the subtasks.

6. The system of claim 4, wherein the dialog library DB includes a response dialog library that is a utterance pattern associated with a response to a dialog of a responder and a corresponding utterance intention, a utterance pattern requesting a predetermined slot value to user or system, a progress dialog library constructed the utterance pattern, and a subtask transition dialog library in which a utterance intention and a utterance pattern for each speaker in the case of start, end, or restart of a subtask are constructed.

7. The system of claim 2, wherein the system dialog managing unit comprises:
    a user intention selecting block to select the best user intention among the user intention candidates using dialog history;
    a user intention processing block to change the dialog history based on a dialog act type of the selected user utterance intention;

a system response utterance generating block to select a utterance pattern suitable for a dialog history using an example based scheme by searching a dialog library DB of the dialog knowledge DB for a response to the selected user utterance intention or a corresponding system speech intention;

a system progress utterance generating block to inquire the user about content in which a goal desired by the user is embodied, by inquiring the user about relevant slots required to embody a value of a target slot for completing a goal of a subtask currently in progress; and a system transition utterance generating block to find a system utterance pattern by searching the dialog library DB for a transition dialog with respect to a current subtask using a system speech intention informing the user about a progress state of the subtask at a point in time of start, end, or restart of the subtask.

8. The system of claim 7, wherein the system dialog managing unit further comprises:

a dialog history including dialog section history that stores a speech intention between the user and the system in a dialog progress order using dialog flow information, subtask history that stores subtask progress history, and slot value history that describes a slot value of a slot that is transmitted and received between the user and the system and a state thereof; and a dialog history management block to manage the history of the dialog history based on each user intention or system intention of the user intention processing block, the system response utterance generating block, the system progress utterance generating block, or the system transition utterance generating block.

9. The system of claim 7, wherein the system progress utterance generating block generates system utterance inquiring slot value for achieving purpose of subtask based on the average dialog turn number required to complete the subtask by initially inquiring the user about relevant slots having a large ambiguous value by referring to the application domain knowledge DB of the dialog knowledge DB, or by transferring, to the user dialog managing unit, the system speech intention to inquire the user about, in order to embody the value of the target slot of the subtask.

10. The system of claim 7, wherein the user dialog managing unit comprises:

a user response utterance generating block to generate a user utterance intention and pattern using an example based scheme by searching a response dialog of the dialog library DB of the dialog knowledge DB for a response to a system speech intention generated by the system dialog managing unit or a corresponding user intention;

a user progress utterance generating block to inquire the user about content in which a goal is embodied in order to complete a goal of a current subtask;

a user transition utterance generating block to generate a user utterance intention and pattern by searching a task transition dialog of the dialog library DB for a user utterance for verifying the content currently selected by the user or proceeding with a new subtask in the case of start or end of the subtask; and a subtask complete estimation block to verify how many dialog turns a currently generated user utterance intention further proceeds based on a response of a system until the goal of the subtask is completed, by repeatedly executing the system dialog managing unit and the user dialog managing unit.

11. The system of claim 10, wherein the user dialog managing unit further comprises:

a temporary dialog history including dialog section history that stores a speech intention between the user and the system in a dialog progress order using dialog flow information, subtask history that stores subtask progress history, and slot value history that describes a slot value of a slot that is transmitted and received between the user and the system and a state thereof; and a temporary dialog history management block to manage the history of the temporary dialog history based on a dialog context that is changed based on the user utterance intention through executing of the user response utterance generating block, the user progress utterance generating block, the user transition utterance generating block, or the subtask complete estimation block.

* * * * *